Figure 1:
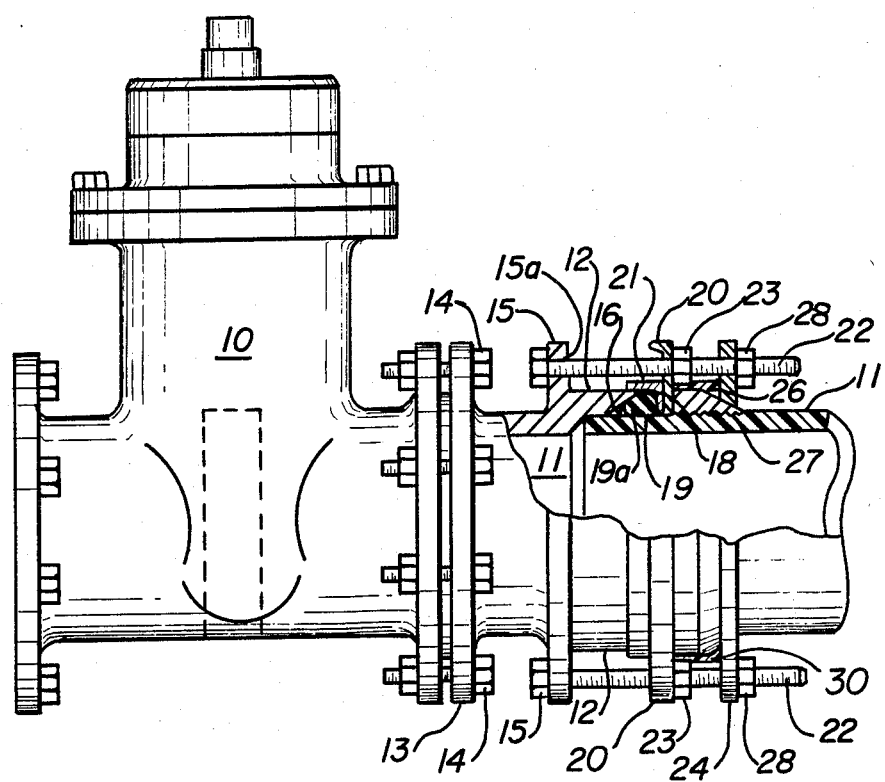

United States Patent [19]

Halen et al.

[11] Patent Number: 4,610,471
[45] Date of Patent: Sep. 9, 1986

[54] FLANGE ADAPTERS

[75] Inventors: Richard M. Halen, Pittsburgh; Robert B. Walsh, Sweet Valley, both of Pa.

[73] Assignee: Coupling Systems, Inc., Pittsburgh, Pa.

[21] Appl. No.: 792,445

[22] Filed: Oct. 29, 1985

[51] Int. Cl.$^4$ ............................................. F16L 21/02
[52] U.S. Cl. .................................... 285/337; 285/174; 285/238; 285/363; 285/368
[58] Field of Search ............... 285/337, 363, 368, 174, 285/238

[56] References Cited

U.S. PATENT DOCUMENTS

| 2,637,197 | 5/1953 | Kaney | 285/263 |
| 3,594,023 | 7/1971 | Yano | 285/337 |
| 3,643,983 | 11/1969 | Ludeman | 285/363 |
| 4,070,046 | 11/1976 | Felker et al. | 285/337 |
| 4,119,335 | 10/1978 | Rieffle et al. | 285/337 |
| 4,429,903 | 2/1984 | Baker | 285/368 |
| 4,487,438 | 12/1984 | Sweeney | 285/368 |
| 4,538,841 | 9/1985 | Royston | 285/337 |

FOREIGN PATENT DOCUMENTS 0814289 6/1969 Canada ................................. 285/337

Primary Examiner—Cornelius J. Husar
Assistant Examiner—Douglas W. Hanson
Attorney, Agent, or Firm—Buell, Ziesenheim, Beck & Alstadt

[57] ABSTRACT

A flange adapter is provided for insertion between a flanged end valve and a plastic pipe having an elongate cylindrical member with a radial outward flange at one end for fastening to a metal valve flange, a second radial outward flange intermediate the ends of the cylindrical member, the other end of the cylindrical member having an enlarged bore with a frusto conical end, said bore receiving a plastic pipe end and a surrounding elastomer gasket with a frusto conical end, a follower abutting the gasket, a compressible frusto conical jaw assembly surrounding the plastic pipe end within a frusto conical opening of a back up ring and tightening means for separately moving the follower to compress the gasket sealingly on the plastic pipe and the back up ring to compress the jaws into the pipe end.

9 Claims, 2 Drawing Figures

FLANGE ADAPTERS

This invention relates to flange adapters and particularly to an adapter by means of which a flange end can be connected to a plastic pipe or the like. The description hereafter will be used with a flange end valve, however, the adapter can be used with any flange end pipe or fitting.

In the gas, oil and water industries in which pipe lines are used to conduct liquids and gases from one place to another there is presently a very significant renewal of pipe line systems, particularly in the gas transmission and distribution area, in which steel pipe is being replaced by plastic pipe or by new steel pipe. This poses problems both in the tie-in connection of the plastic pipe to the old steel pipe as well as in valving of the plastic pipe itself. Where steel pipe is connected to plastic pipe, a special transition fitting is required which can seal and hold both types of pipe. If a valve is necessary at the connection, it was necessary prior to this invention, to insert the valve in the steel pipe using a stub end to connect the plastic pipe and to weld to valve both to the pipe line and the stub end connector. So far as we are aware, no one has provided a structure which would solve this problem of connecting a flanged metal valve to a plastic pipe line. This problem is particularly acute in the larger diameter plastic lines.

We have developed a connector by means of which a flanged end valve or other flange end pipe structure can be connected to a plastic transmission line to both seal and hold the plastic pipe or new steel pipe to the valve structure.

We provide a connector for connecting a flanged end of a metal valve or the like to a plastic pipe or the like comprising an elongate generally cylindrical member having a bore therethrough, a flange at one end adapted to be sealingly attached to the flange of a valve to be connected to a plastic pipe, a second flange on said cylindrical member intermediate its ends, an enlarged cylindrical bore at the other end of said cylindrical member for receiving the end of a plastic pipe to be connected, said enlarged bore having a generally frusto conical end opening outwardly to the end of the valve passage, an elastomeric gasket having a generally frusto conical end portion adapted to fit into said frusto conical end portion of said enlarged bore in sliding engagement with the plastic pipe to be connected to the valve, a follower member bearing on said gasket to force it into the frusto conical end bore, tightening means between the follower means and flange on the valve body acting on the follower means to move it axially toward the valve body whereby the gasket is forced into the frusto conical end of the enlarged bore in sealing engagement with said bore and with a plastic pipe end inserted therein, a back up ring spaced from said follower ring and surrounding said plastic pipe end, said back up ring having a frusto conical end opening toward the valve body, a compressible frusto conical jaw means in said frusto conical opening in the back up ring and surrounding said plastic pipe end to be connected, surface engaging means on said jaw means engaging the surface of said plastic pipe against axial movement and auxiliary tightening means between the follower ring and back up ring for drawing the back up ring toward the follower ring to compress the jaw means radially inwardly to engage the surface of the plastic pipe end. Preferably the tightening means is a bolt extending through holes in the second flange and follower means with tightening nuts bearing on the follower means. The auxiliary tightening means is preferably an extension of said bolts beyond the follower means to pass through holes in the back up ring and receive nuts bearing on the back up ring. The frusto conical jaw means may be a single slit ring as in German Pat. No. P 1944782.6, a plurality of spaced jaw members or a multiple split ring as in U.S. Pat. No. 4,070,046. The sealing gasket may be of rubber, neoprene or any other suitable elastomeric material capable of creating a seal under pressure. Preferably, an annular sleeve is provided on the follower member extending over the outer periphery of the gasket and containing the gasket against outward radial expansion.

Figure 2:
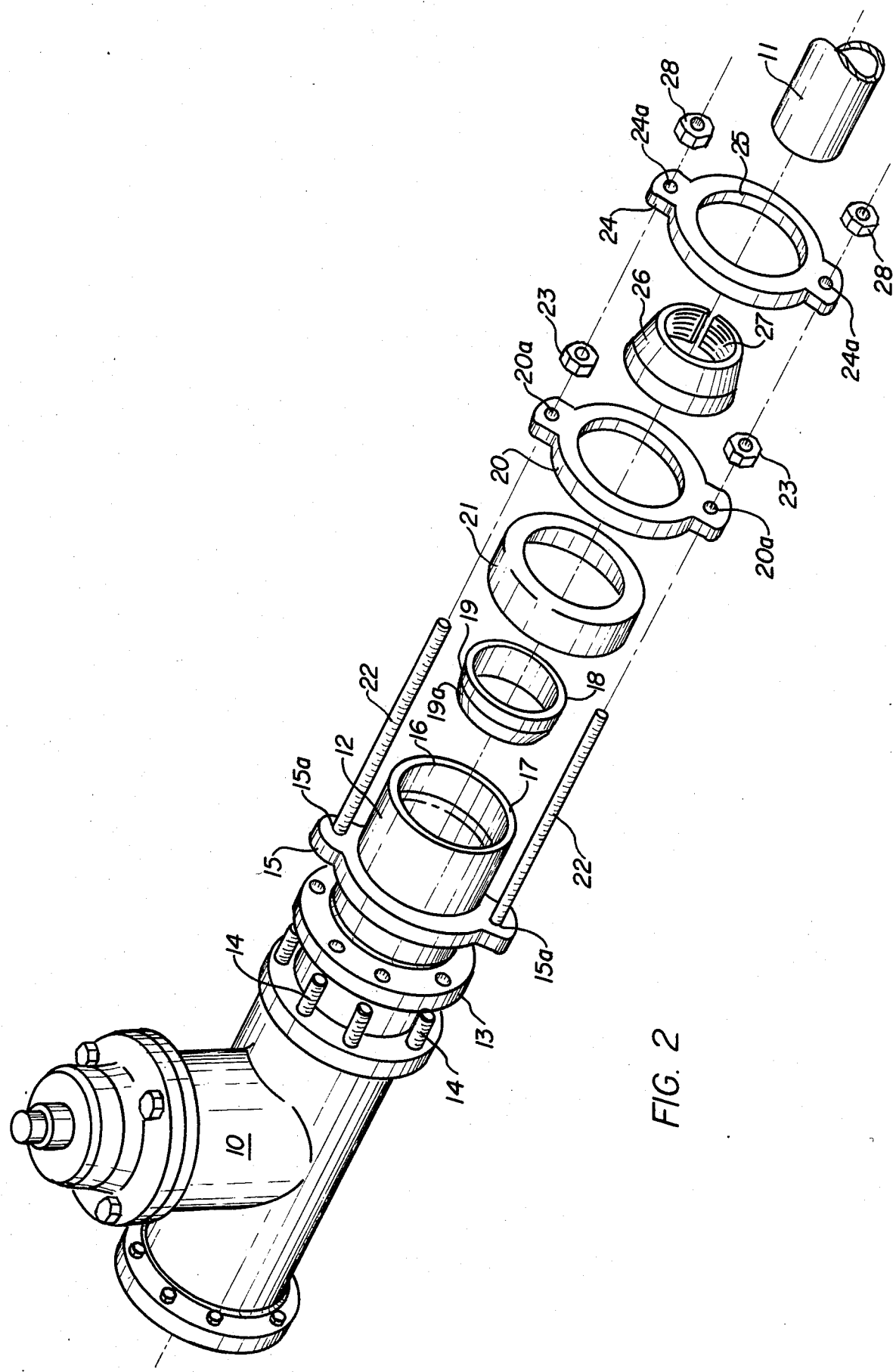

In the foregoing general description we have set out certain objects, purposes and advantages of this invention. Other objects, purposes and advantages of this invention will be apparent from a consideration of the following description and the accompanying drawings in which:

FIG. 1 is a side elevation of a flange adapter according to this invention partly in section connecting a valve and plastic pipe; and FIG. 2 is an isometric, partly exploded, view of the flange adapter of FIG. 1.

Referring to the drawings, we have illustrated a flange adapter structure according to our invention connecting a valve body 10, with a plastic pipe 11. The flange adapter of our invention is made up of an elongate cylindrical body 12 having a radial outward flange 13 at one end adapted to be bolted to a flange end of valve body 10 by bolts 14. A second radial outward flange 15 is provided on cylindrical body 12 intermediate its ends. The opposite end of body 12 is enlarged to provide an enlarged bore 16 to receive the end of plastic pipe 11 being coupled. Enlarged bore 16 has, at its open end, a frusto conical opening 17 receiving an elastomer gasket 18 around the plastic pipe 11. The gasket 18 preferably has a short cylindrical body portion 19 with a frusto conical end portion 19a adapted to fit sealingly in frusto conical opening 17 around the plastic pipe. A follower 20 having a cylindrical sleeve portion 21 surrounds gasket 18, the end of body 12 and the follower 20 is snugly slidably fitted over plastic pipe end 11 to abut the transverse face of gasket 19. Bolts 22 extend through holes 15a in intermediate flange 15, and through holes 20a in follower 20, and receive tightening nuts 23 for drawing follower 20 axially toward valve body 10 to force the gasket 18 into the frusto conical opening 17 of sleeve 16 and into tight sealing engagement with both enlarged bore 16 and plastic pipe 11. Spaced from follower 20 is a back up ring 24 with a frusto conical opening 25 receiving split jaws 26. The split jaw 26 or its equivalent may be a split ring or separately connected jaws as disclosed in the German or U.S. patents, supra. The jaw 26 has toothed grooves 27 adapted to engage the surface of the plastic pipe end 11 to prevent its withdrawal from bore 16. The bolts 22 extend through openings 24a in the back up ring and nuts 28 draw back up ring 24 axially toward follower 20 with opening 25 compressing jaw means 26 tightly into engagement with plastic pipe 11 so that toothed grooves 27 are forced into the surface of the pipe end to prevent its removal from bore 16.

A cylindrical elastomer sleeve 30 may be inserted between follower 20 and back up ring 24 over jaw means 26 to act as a moisture seal.

While we have described this invention as used in connection with a plastic pipe where we believe it has greatest utility, it may equally well be used to connect a flanged valve to a steel pipe without the need for welding a flange to the pipe, as in the past.

We have described certain preferred practices and embodiments of this invention in the foregoing specification, however, it will be understood that this invention may be otherwise embodied within the scope of the following claims.

We claim:

1. A flange adaptor for connecting a flanged valve end to a plain ended plastic pipe end or the like comprising an elongate generally cylindrical member having a bore lengthwise thereof, a radial outward flange at one end of said cylindrical member for attachment to a flanged end of a valve to be connected to a plastic line or the like, a second radial outward flange intermediate the ends of said member, an enlarged cylindrical bore at the other end of said cylindrical member for receiving the end of a plastic pipe to be connected, said enlarged bore having a generally frusto conical end portion opening outwardly, an annular elastomeric gasket adapted to slidably and snugly fit over the end of said plastic pipe and having a generally frusto conical end portion adapted to fit into the frusto conical opening of said bore, a follower member bearing on said gasket to force said gasket into said bore, an annular sleeve on said follower member extending over said gasket and containing said gasket against radial expansion, tightening means between the follower member and said second flange acting on the follower member to move said follower member axially toward the valve body to force said gasket into sealing engagement with the bore and plastic pipe end, a back up ring adjacent said follower having a frusto conical opening surrounding said plastic pipe, a compressible frusto conical jaw means in said opening in the back up ring surrounding and engaging the plastic pipe end, surface engaging means on said jaw means engaging said plastic pipe against axial movement and auxiliary tightening means between said second flange, the follower and the back up ring drawing the back up ring axially toward the follower and compressing the jaw means radially inwardly into engagement with the plastic pipe.

2. A flange adapter as claimed in claim 1 wherein the tightening means is a threaded bolt extending through holes in the second flange, the follower and the back up ring with nuts engaging the follower to move it axially toward the valve body and auxiliary nuts engaging the back up ring moving it toward the valve connector member and the follower.

3. A flange adapter as claimed in claim 1 or 2 wherein the surface engaging means on the jaw means are axially spaced annular teeth.

4. A flange adapter as claimed in claim 1 or 2 wherein the elastomeric gasket is rubber.

5. A flange adapter as claimed in claim 3 wherein the elastomeric gasket is rubber.

6. A flange adapter as claimed in claim 1 or 2 having a cylindrical elastomeric sleeve surrounding the jaw means and extending sealingly between the follower and the backup ring.

7. A flange adapter as claimed in claim 3 having a cylindrical elastomeric sleeve surrounding the jaw means and extending sealingly between the follower and the back up ring.

8. A flange adapter as claimed in claims 1 or 2 wherein the elastomeric gasket is neoprene.

9. A flange adapter as claimed in claim 3 wherein the elastomeric gasket is neoprene.

* * * * *